United States Patent
Ogawa et al.

(10) Patent No.: US 6,521,334 B1
(45) Date of Patent: *Feb. 18, 2003

(54) TRANSPARENT SUBSTRATE AND METHOD OF MANUFACTURING THE SAME

(75) Inventors: Kazufumi Ogawa, Hirakata; Norihisa Mino, Settsu; Mamoru Soga, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,264

(22) Filed: May 12, 2000

Related U.S. Application Data (63) Continuation of application No. 08/383,428, filed on Feb. 3, 1995, now abandoned, and a continuation of application No. 08/279,686, filed on Jul. 25, 1994, now abandoned, and a continuation of application No. 08/065,683, filed on May 21, 1993, now abandoned, and a continuation of application No. 07/798,525, filed on Nov. 26, 1991, now abandoned.

(30) Foreign Application Priority Data

Dec. 25, 1990 (JP) .............................. 2-405755
Feb. 6, 1991 (JP) .............................. 3-038135

(51) Int. Cl.[7] ................................ B32B 7/00
(52) U.S. Cl. ................ 428/333; 428/410; 428/429; 428/447; 428/450; 428/451
(58) Field of Search .................. 428/333, 410, 428/429, 447, 450, 451

(56) References Cited

U.S. PATENT DOCUMENTS 2,951,862 A  9/1960  Pierce
3,012,006 A  12/1961 Holbrook et al.
3,114,760 A  12/1963 McBee et al.

(List continued on next page.)

FOREIGN PATENT DOCUMENTS

| CA | 604002 | 8/1960 |
|---|---|---|
| EP | 0 282 188 | 9/1988 |
| EP | 0 282 188 A1 * | 9/1988 |
| GB | 746510 | 3/1956 |
| GB | 805028 | 11/1958 |
| GB | 1 140 072 | 1/1969 |
| JP | 58-167448 | 10/1983 |

OTHER PUBLICATIONS

European Search Report for corresponding EPO Application No. 91 12 2017, dates Dec. 3, 1992.

Netzer et al., "Adsorbed Monolayers Versus Langmuir – Blodgett Monolayers–Why and How? I: From Monolayer to Multilayer, By Adsorption", *Thin Solid Films*, vol. 99, pp. 235–241 (1983).

(List continued on next page.)

*Primary Examiner*—D. S. Nakarani
(74) *Attorney, Agent, or Firm*—Ratner & Prestia (57) ABSTRACT

At least one monomolecule film is formed on a transparent substrate surface directly or via a protective film. The monomolecule film is formed with chemical coupling of chlorosilane surface active compound, for example, of the formula:

$$F(CF_2)m(CH_2)nSiR_qX_{3-q}$$

where m is an integer of from 1 to 15, n is an integer of from 0 to 15 provided that the total of m and n is an integer of from 10 to 30 and R is an alkyl or an alkoxyl group, or $$F(CF_2)m'(CH_2)n'A(CH_2)pSiR_qX_{3-q}$$

where m represents an integer ranging from 1 to 8, n' represents an integer ranging from 0 to 2, p represents an integer ranging from 5 to 25, q represents an integer ranging from 0 to 2, X represents a halogen atom or an alkoxyl group, R represents an alkyl or an alkoxyl group, and A represents O, a —COO— or —Si(CH$_3$)$_2$—. The transparent substrate such as glass is made hydrophobic and free of contamination.

16 Claims, 8 Drawing Sheets

U.S. PATENT DOCUMENTS

| | | | |
|---|---|---|---|
| 3,127,433 A | | 3/1964 | Tarrant |
| 3,427,336 A | | 2/1969 | Tiers |
| 3,579,557 A | | 5/1971 | Brooks et al. |
| 4,120,995 A | | 10/1978 | Phipps et al. |
| 4,539,061 A | * | 9/1985 | Sagiv .................. 156/278 |
| 4,673,474 A | | 6/1987 | Ogawa |
| 4,724,022 A | | 2/1988 | Armstrong |
| 4,983,459 A | * | 1/1991 | Franz et al. ............. 428/410 |
| 4,992,300 A | * | 2/1991 | Ogawa et al. ............. 427/44 |
| 4,997,684 A | | 3/1991 | Franz et al. |
| 5,011,963 A | | 4/1991 | Ogawa et al. |
| 5,133,895 A | | 7/1992 | Ogawa et al. |
| 5,380,585 A | * | 1/1995 | Ogawa et al. ............. 428/333 |
| 5,580,605 A | | 12/1996 | Ogawa et al. |

OTHER PUBLICATIONS

Japanese Society of Applied Physics Catalog No. AP 901110–03, Announcement of Lecture held Mar. 28–31, 1991, translation of relevant section 31p–Q–1 on page 1048.

Ogawa et al., "Reactions of Chemically Adsorbed Monolayers Induced by Electron Beam Irradiation in Active Gas Atmosphere and Applications for the Preparation of Multilayers", *Langmuir*, vol. 6, No. 4, pp. 851–856 with cover sheet (1990).

Mullin et al., "Properties of Liquid–Crystal Monolayers on Silane Surfaces", *Physical Review*, vol. 39, No. 7, pp. 3745–3747 (Apr. 1989).

Netzer et al., "A New Approach to Construction of Artifical Monolayer Assemblies", J. Am. Chem. Soc., vol. 105, pp. 674–676 (1983).

John Wiley & Sons, Encyclopedia of Chemical Technology, vol. 10, pp. 125–142 (1980).

Translation of JP 58–167448, Oda et al. (10/93).

* cited by examiner

TRANSPARENT SUBSTRATE AND METHOD OF MANUFACTURING THE SAME

RELATED APPLICATIONS

This application is a continuation of U.S. patent applications Ser. No. 08/279,686, filed Jul. 25, 1994, now abandoned, and of Ser. No. 08/383,428, filed Feb. 3, 1995, now abandoned, each of which claim parentage to original parent application Ser. No. 07/798,525, filed Nov. 26, 1991, now abandoned which is a continuation of Japanese Patent Applications 2-407555 and 3-038135 filed on Dec. 25, 1990 and Feb. 6, 1991, respectively, which is a continuation of Ser. No. 08/065,683 filed May 21, 1993.

FIELD OF THE INVENTION

This invention relates to a transparent substrate. More particularly, the present invention relates to a hydrophobic, oil-phobic and/or contamination-free transparent substrate such as motor vehicle and building window glasses, windshields, optical lenses and glass lenses etc.

BACKGROUND OF THE INVENTION

In order to prevent contamination of a transparent substrate such as glass, it has been proposed to make the surface of the transparent substrate as smooth as possible or coat the substrate surface with a protective film such as a fluorine-based coating film or the like. Further, to prevent fogging of the transparent substrate surface, a hydrophilic polymer is coated thereon, or a heater is installed in or onto the transparent substrate.

Where the contamination of a transparent substrate stems from water drops, an antifogging effect can be obtained by installing a heater. However, the use of a heater has a drawback, namely a power source for the heater is necessary. Furthermore, a heater which is buried in or installed on the surface of the transparent substrate may reduce the transparency thereof. Coating the transparent substrate surface with a hydrophilic polymer or the like is comparatively simple. However, only a tentative effect is achieved because the hydrophilic polymer may be peeled off by rubbing the transparent substrate surface.

Where contamination of the substrate surface stems from other causes the above methods are substantially meaningless. Accordingly, it has been proposed to coat the transparent substrate surface with a protective film, for example fluorine-based coatings. However, the adhesion between the transparent substrate and a fluorine-based protective film is weak. Therefore the film is readily separated from the substrate surface. In addition, the fluorine-based protective film causes fogging of the transparent substrate due to its opaqueness. Other protective film materials can improve upon the transparency and adhesion of the flourine-based protective films. However, these materials do not enable easily wiping-out of contaminants. Accordingly, it is a practical method to make the surface of the transparent substrate as smooth as possible. However, there are limitations on the degree of smoothness of the substrate surface which one skilled in the art can attain. Thus, there is a need for a contamination free, hydrophobic and/or oil phobic treated transparent substrate.

SUMMARY OF THE INVENTION

An object of the present invention is to provide a highly hydrophobic and contamination free transparent substrate, which is free from the attachment of contaminants thereon or is capable of the ready removal of any attached contaminants.

To attain this object, the instant invention provides a transparent substrate, which is provided on at least one surface thereon with a chemically adsorbed monomolecule film containing a hydrophobic group.

A first aspect of this invention provides a transparent substrate comprising at least one monomolecule film formed as an outer most surface layer on at least one surface of a transparent substrate either directly or indirectly via a protective film. The monomolecule film contains a hydrophobic group and is bonded through covalent bonding to the surface of the substrate or of the protective film. Preferably, the protective film is itself one or more of such monomolecule films containing a hydrophobic group and bonded through a covalent bond to the surface of the substrate. A difference between the (a) monomolecule film of the protective film and (b) the outer most surface layer monomolecule film is that (a) is at or near the end of the hydrophobic group and the protective film monomolecule is bonded through a covalent bond to (b), the outer most surface layer monomolecule film. Another difference is that (b) is bonded to the protective layer monomolecule film one layer closer to the outer most surface. One preferred embodiment of the first aspect of this invention provides a transparent substrate comprising a monomolecule film formed as an outer surface layer on both surfaces of a transparent substrate either directly or indirectly via a protective film. In particular, one of the surfaces (the first surface) is covered with a monomolecule film containing a hydrophobic group which is covalently bonded to the first surface. The other surface (the second surface) is covered with a monomolecule film containing a hydrophilic group which is covalently bonded to the second surface.

According to another embodiment of the first aspect of this invention, the monomolecule film is formed by a covalent bond from a silane halide-based or alkoxy silane-based surface-active compound of the formula:

$$F(CF_2)_m(CH_2)_nSiR_qX_{3-q} \quad (A)$$

where m represents an integer ranging from 1 to 15, n represents an integer ranging from 0 to 15, the sum of m and n ranges from 10 to 30, q represents an integer ranging from 0 to 2, R represents an alkyl or an alkoxyl group, and X is a halogen atom or an alkoxyl group; or $$F(CF_2)_{m'}(CH_2)_{n'}A(CH_2)_pSiR_qX_{3-q} \quad (B)$$

where m' represents an integer ranging from 1 to 8, n' represents an integer ranging from 0 to 2 p represents an integer ranging from 5 to 25, q represents an integer ranging from 0 to 2, X represents a halogen atom or an alkoxyl group, R represents an alkyl or an alkoxyl group, and A represents —O—, a —COO— or —Si(CH$_3$)$_2$—.

A second aspect of this invention provides a method of modifying a transparent substrate, comprising:

applying, in a non-aqueous organic solvent, a silane based surface active molecular compound having a reactive silane group at one end of the molecular compound and a hydrophobic group at the other end of the molecular compound to a surface of a transparent substrate or on a surface of a protective film provided on the transparent substrate. The molecular compound is applied under conditions such that the silane-based surface active compound is chemically adsorbed on the surface thereby forming a monomolecule film on the transparent substrate. The film comprises a hydrophobic group, an —Si— group wherein the film is covalently bonded to the applied surface.

One preferred embodiment of the second aspect of this invention provides such a method which comprises:

contacting a surface of a molded transparent substrate with an organic solvent solution of a silane-based surface active compound having a reactive silane group at one end of the molecule and a hydrophobic group at the other end of the molecule to form a chemically adsorbed monomolecule film of the silane-based surface active compound on at least one surface of the transparent substrate or over the entire surface area.

Another preferred embodiment of the second aspect of this invention provides such a method which comprises:

contacting both of the surfaces of the molded transparent substrate with a non-aqueous solvent containing a material having at least two chlorosilyl groups;

washing the transparent substrate using a non-aqueous organic solution to remove any non-reacted material having at least two chlorosilyl groups of the transparent substrate after the contacting step;

treating the transparent substrate with water after the non-reacted material washing step, thereby forming a hydrophilic monomolecule film composed of a silane material having at least one silanol group; and treating the transparent substrate having the silanol group with a silane-based surface active compound having a reactive silane group at one end of the molecule and a hydrophobic group at the other end of the molecule, thereby laminating a chemically adsorbed hydrophobic monomolecule film on the hydrophilic monomolecule film having silanol groups.

DETAILED DESCRIPTION OF THE INVENTION

The transparent substrate component of the instant invention is usually made of transparent materials such as glass and plastic. Where the substrate is made of glass, its surface typically comprises hydrophilic molecules such as hydroxyl groups. Where a plastic is the substrate material, the surface may be readily made hydrophilic by an oxidizing treatment. By contacting the substrate material with a non-aqueous organic solvent solution of a compound having a carbon chain and a reactive silane group at one end, a reaction between active hydrogens in the hydrophilic groups of the substrate surface and the reactive silane group forms a monomolecule film. The monomolecule film is bonded to the surface by an —SiO— group containing chemical bond (i.e., a covalently bonded). Such a reaction is called a chemical adsorption reaction, and the monomolecule film obtained by this reaction is called a chemically adsorbed single molecule (or unimolecule or monomolecule) film. In use, when the chemically adsorbed monomolecule film is covalently bonded to a real image side mirror surface, its adhesion is so strong that usually it is not separated unless the surface of the transparent substrate is cut away. Furthermore, because the compound has a hydrophobic group at the other end, the hydrophobic properties of the monomolecule provides a contamination free effect.

As noted before, the transparent substrate material may be a plastic material. Suitable plastic materials include acrylic resins and polycarbonate resins. Such plastic substrates may be used in addition to glass, although glass is most extensively used.

The surface of the transparent substrate has an exposed hydrophilic group. Examples of hydrophilic groups are those groups having active hydrogen, e.g., hydroxyl groups, carbonyl groups, amino groups, imino groups, etc. Where the transparent substrate surface does not have a sufficient amount of hydrophilic groups, the surface is rendered hydrophilic by usual means such as electron or ion beam irradiation in an oxygen or nitrogen atmosphere.

The molecule constituting the chemically adsorbed monomolecule film may be a silane-based surface active compound having a chlorosilane (—SiCl$_v$Y$_{3-v}$) group or an alkoxysilane (Si(OW)$_v$Y$_{3-v}$) group at one end of the molecule and a hydrocarbon group or fluorine-substituted carbon at the other end of the molecule. In the above formulas, v represents an integer ranging from 1 to 3, Y represents a hydrogen atom or a lower alkyl (for example C$_1$ to C$_6$) or lower alkoxyl group (for example C$_1$ to C$_6$), and W represents a lower alkyl group. Among the silane-based surface active compounds mentioned above, chlorosilane-based surface active compounds are preferred because they can reliably undergo a chemical adsorption reaction to form a chemically adsorbed monomolecule film at room temperature. Among the chlorosilane-based surface active compounds, those having a trichlorosilane group (v is 3) are preferred because siloxane bonds intervene between adjacent adsorbed molecules. Further, in order to increase the concentration of the adsorbed molecule, the silane-based surface active compound having a straight chain is preferred. Examples of especially preferred chlolosilane-based surface active compounds are those represented by the formulas:

$$R^1 \text{—SiCl}_v Y_{3-V} \tag{C}$$

and $$CF_3-(CF_2)_t-(R^2)_r-SiCl_vY_{3-v} \quad \text{(D)}$$

where t is an integer of at least 0, preferably 0 to 10, r is 0 or 1, R¹ is an alkyl group of at least 6 (preferably 8 to 22) carbon atoms which may contain a vinyl ($CH_2=CH-$) or ethynyl ($CH\equiv C-$) group or may be interrupted by a COO group or by a silicon or oxygen atom, R² is an alkylene group of at least one (preferably 1 to 20) carbon atoms which may contain a vinylene ($-CH=CH-$), ethynylene ($-C\equiv C-$) group or may be interrupted by a COO group or by a silicon or oxygen atom, and Y is a hydrogen atom, a lower alkyl group (for example $C_1$ to $C_6$) or lower alkoxyl group (for example $C_1$ to $C_6$), and v is an integer ranging from 0 to 2. Preferably, those chlorosilane-based surface active compounds have 12 to 22 carbon atoms. More specific examples include:

$CH_3(CH_2)_9SiCl_3$,
$CH_3(CH_2)_{15}SiCl_3$,
$CH_3CH_2O(CH_2)_{15}SiCl_3$,
$CH_3(CH_2)_2Si(CH_3)_2(CH_2)_{15}SiCl_3$,
$CF_3(CF_2)_7(CH_2)_2SiCl_3$,
$CF_3CH_2O(CH_2)_{15}SiCl_3$, $CF_3(CH_2)_2Si(CH_3)_2(CH_2)_{15}SiCl_3$,
$CF_3(CF_2)_3(CH_2)_2Si(CH_3)_2(CH_2)_9SiCl_3$,
$CF_3COO(CH_2)_{15}SiCl_3$,
$CF_3(CF_2)_5(CH_2)_2SiCl_3$.

Those surface active compounds in which R¹ in the above formulas contains a vinyl or ethynyl group are preferred, because a polymerization of unsaturated bonds with a catalyst, with light or high energy irradiation, may occur. Polymerization of unsaturated bonds results in intramolecular bonds and therefore an undesirably firmer monomolecule film. Furthermore, the chlorosilane-based surface active compounds having a hydrophobic group containing a fluorocarbon group are particularly preferred, because the resulting monomolecule film is highly hydrophobic as well as an oil-phobic effect (i.e., oil-repellant).

The transparent substrate according to the instant invention is usually manufactured from a molded transparent substrate.

When the chlorosilane-based surface active material is used, the chemically adsorbed monomolecule film usually has to be washed without contact with water. Water should be avoided because any of the remaining unreacted chlorosilane-based surface active compound reacts with the water component of the wash and becomes whitish in color.

Further, the clorosilane-based surface active compound has to be dissolved in a non-aqueous (substantially non-water) organic solvent because it is highly reactive with water. Examples of applicable solvents include n-hexadecane, toluene, xylene, dicyclohexyl, carbon tetrachioride, chloroform, or freon 113. These solvents may be used either alone or in combination. However, it is possible to use methyl alcohol or ethyl alcohol as the solvent in cases when other silane-based surface active compounds are used rather than those based on chlorosilane.

Figure 9:
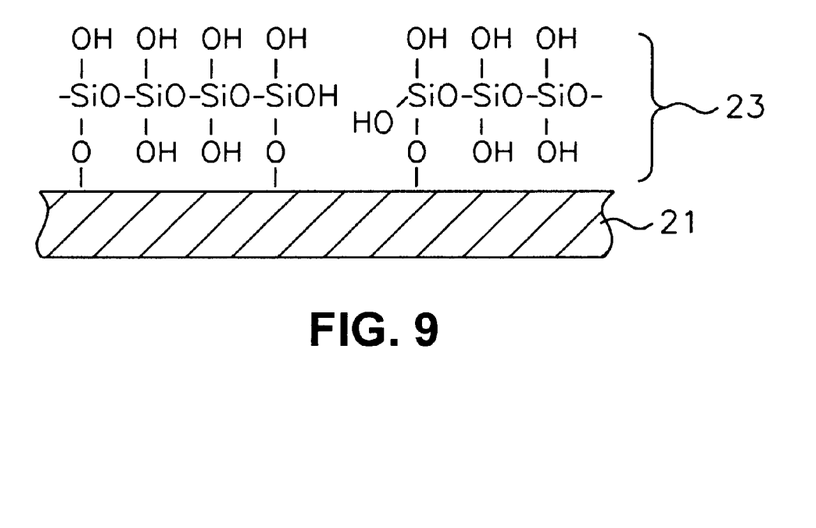
FIG. 9 is a schematic sectional view, enlarged in scale to the molecular level, showing a windshield glass as a further embodiment of the transparent substrate according to the invention.

To form the chemically adsorbed monomolecule film according to the invention, one surface of the transparent substrate may be contacted with a material having at least two chlorosilyl groups, before a silane-based surface active compound containing a hydrophobic group is chemically adsorbed on the transparent substrate surface. The material having at least two Cl—Si groups reacts with an active hydrogen-containing group of the transparent substrate surface, reacting one or more Cl—Si groups but not all of them, so the unreacted Cl—Si groups remain in the reacted material. The surface of the transparent substrate thus-treated is then washed with an organic solution to remove the unreacted material containing at least two chlorosilyl groups. The surface is then treated with water (washing with water or exposing to air to react with moisture in the air) to form a monomolecule film containing silanol groups (Si—OH) on the surface of the substrate (see FIG. 9).

Formation of a monomolecule film containing silanol groups is desirable because a silane-based surface active compound can be chemically adsorbed at a high concentration even when the substrate has only a very small quantity of hydrophilic groups, such as a quartz glass or tempered glass. Examples of materials having at least two chlosilyl groups are:

$SiCl_4$, $SiHCl_3$, $SiH_2Cl_2$,
$Cl-(SiCl_2O)_iSiCl_3$, and
$H_l(R^3)_{3-l}Si(R^4)_iSiCl_k(R^5)_{3-k}$.

It is usually desired that the number of Cl—Si bonds is as large as possible for high concentration chemical adsorption of the silane-based surface active compound containing hydrophobic groups. In the above formulas, i represents an integer such as 1 to 4, l and k each represent an integer ranging from 1 to 3, R³ and R⁵ are lower-alkyl groups, and R⁴ represents an alkylene group with a carbon number of at least 1 such as 1 to 6. Preferably the materials have 3 or 4 Cl—Si bonds and are inorganic. Therefore, $SiCl_4$ is most preferred as the material containing a chlorosilyl group, because it is a very small molecule and is highly reactive for producing silanol groups. Thus it is highly effective for making a quartz glass surface uniformly hydrophilic.

It is possible to form a chemically adsorbed monomolecule film containing a hydrophobic group on only one surface of a transparent substrate and form a chemically adsorbed monomolecule film containing a hydrophilic group on the other surface, thus obtaining a substrate with has different characteristics on opposite sides. Such a substrate may be obtained by chemically adsorbing the above-mentioned material containing a chlorosilane group on both surfaces of a transparent substrate. Both surfaces are then treated as described above to form silanol groups. The surface on which it is desired to leave a hydrophilic monomolecule film is then coated with an aqueous solution of a water-soluble polymer material, e.g., polyvinyl alcohol or prulane. A chemically adsorbed monomolecule film containing a hydrophobic group is then formed on the other surface of the substrate. Subsequently the water-soluble polymer material is washed away with water.

The chemically adsorbed monomolecule film according to the invention may be either a single monomolecule layer or a lamination of two or more monomolecule layers. In the latter case, however, it is necessary to form chemical bonds between adjacent laminated layers. For producing such a lamination of monomolecule layers, one preferred method is as follows. First a chlorosilane based surface active compound (for example, of the formula (C) mentioned above) having a group (such as a vinyl or ethynyl group) that can subsequently be converted to an active hydrogen-containing reactive group (such as a hydroxyl, imino or amino group) is used to form a monomolecule film. The convertible group is then converted to the active hydrogen-containing reactive group. A chlorosilane-based surface active compound is applied to this treated surface to form a hydrophobic monomolecule film.

The chemically adsorbed monomolecule film formed on the substrate surface is as thin as of the order of the nanometer (nm) and does not spoil the intrinsic transparency of the substrate. In addition, the chemically adsorbed monomolecule film according to the invention has hydrophobic properties and is therefore not readily susceptible to surface contamination. Further, by forming a chemically adsorbed hydrophobic monomolecule film on one surface of a transparent substrate and forming a chemically adsorbed hydrophilic monomolecule film on the other surface of the substrate, a transparent substrate which has hydrophobic and contamination-free effects on one surface and an antifogging effect on the other surface can be obtained.

This invention can be applied to a variety of materials including a display-form touch panel switch, a face plate for photocopy machine, a fresnel plate for an overhead projector, a display glass, a display optical filter, a halogen lamp, a mercury lamp a sodium lamp, an electric bulb, a chandelier, a glass or plastic lens, a microscope lens a telescope lens, a binocular lens, a magnifying glass lens and other apparatus lenses.

This invention will now be illustrated with reference to the following examples and the drawings, but the scope of the invention is not to be construed as limited to these examples.

EXAMPLE 1

Figure 1:
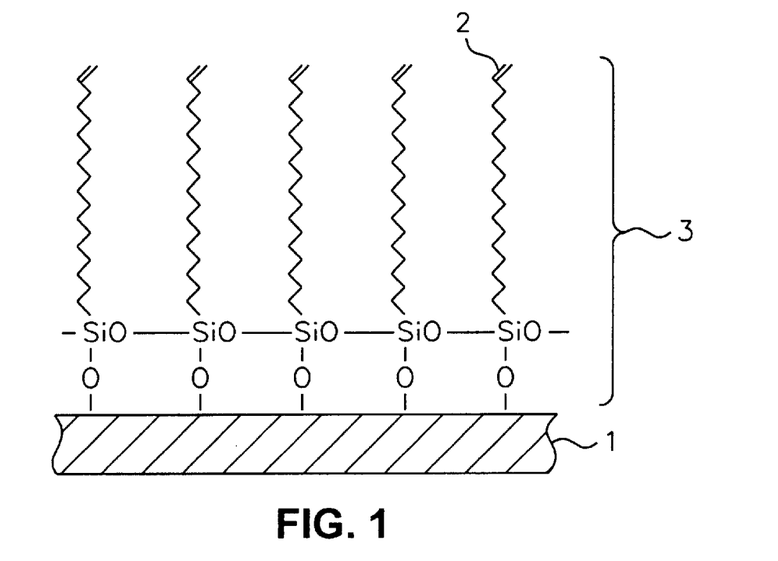
FIG. 1 is a schematic sectional view, enlarged in scale to the molecular level, showing the status of a glass surface in the formation of a chemically adsorbed film.

In a chloroform solution containing 80 wt % n-hexadecane and 12 wt % carbon tetrachloride a silane-based surface active compound represented by a formula:

containing vinyl groups ($CH_2=CH-$)$_2$ (see FIG. 1) is dissolved to a concentration of $3 \times 10^{-3}$ to $5 \times 10^{-2}$ Mol. A glass substrate 1 as a transparent substrate was dipped into the solution and held at room temperature for one hour. The surface of the glass substrate 1 contained a number of hydroxyl groups and a reaction took place between the chlorosilyl groups (—SiCl) in the chlorosilane-based surface active compound and the hydroxyl groups (—OH) and a bond represented such as formula 1:

Formula 1 is formed on the substrate surface.

The glass substrate 1 was then washed with freon 113 to remove the material remaining on the surface without any reaction, followed by washing the surface with water or exposing the surface to air to react with moisture in the air. The —SiCl group was changed to a —SiOH group as in formula 2.

Formula 2

Each silanol group (—SiOH) was then dehydrated and crosslinked to form a siloxan bond (—SiO—) as in formula 3.

Formula 3

Figure 2:
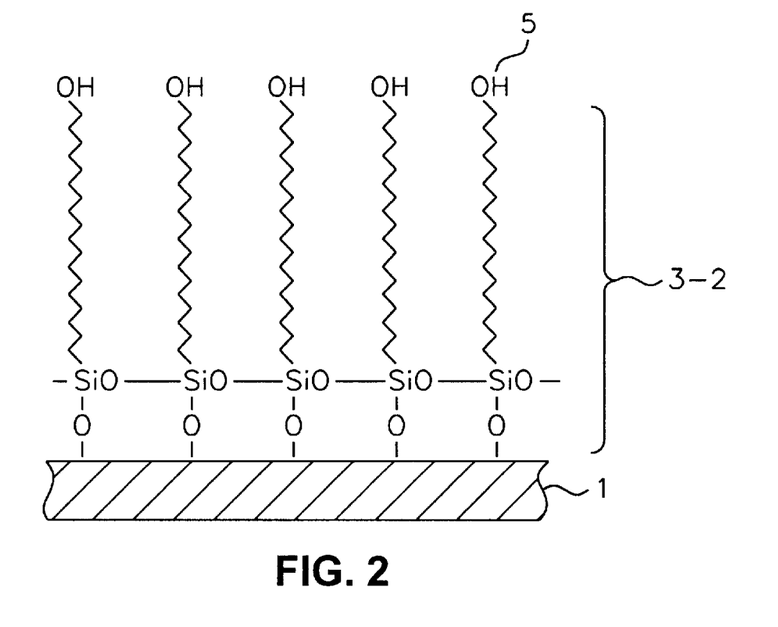
FIG. 2 is a schematic sectional view enlarged in scale to the molecular level, showing the status of a glass surface in the formation of a chemically adsorbed film.
Figure 3:
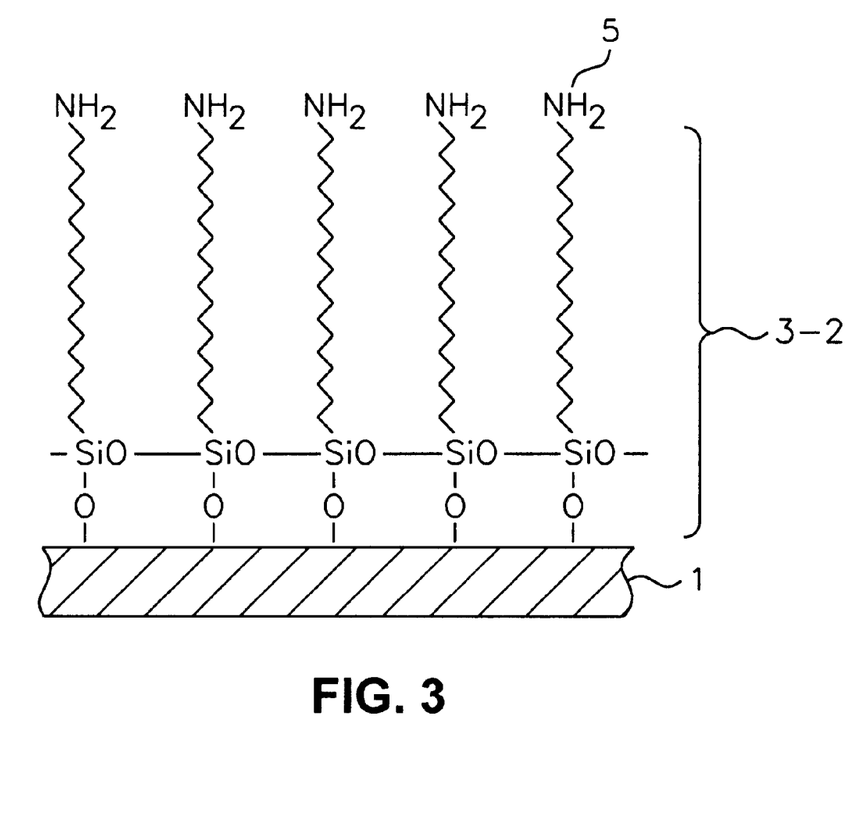
FIG. 3 is a schematic sectional view, enlarged in scale to the molecular level, showing the status of a glass surface in the formation of a chemically adsorbed film.

Thus, an adsorbed monomolecule protective film 3 containing a vinyl group 2 was formed as a single layer with a thickness from about 2 to 3 nm on the surface in a chemically coupled form via oxygen atoms (see FIG. 1). The glass substrate is then irradiated in an atmosphere containing oxygen or $N_2$ (or in air) with about 3 Mrads of an energy beam (e.g., electron beam, X-rays, gamma ($\gamma$) rays, ultraviolet (UV) rays or ion beam), thus providing the vinyl group portion 2 with a hydroxyl (—OH) groups 4 (in case of oxygen atmosphere) as shown in FIG. 2 or amino (—$NH_2$) group 5 (in case of nitrogen atmosphere) as shown in FIG. 3. The hydroxyl, amino, and/or imino groups may be formed in air.

The fact that these functional groups are attached to vinyl groups is confirmed from FT-IR analysis.

It is possible to process the vinyl groups arranged on the surface in plasma containing $O_2$ or $N_2$ as well to form an adsorbed monomolecule protective film 3-1 (see FIG. 4) with attached —OH groups as shown in FIG. 2 or an adsorbed monomolecule protective film 3-2 with attached —$NH_2$ groups as shown in FIG. 3.

Finally, a solution of a mixed solvent composed of 80 wt % n-hexane, 12 wt % carbon tetrachloride and 8 wt % chloroform was prepared by dissolving a silane-based surface active compound containing fluorine represented by a formula:

(A)

where m represents an integer ranging from 1 to 15, n represents an integer ranging from 0 to 15, the sum of m and n ranges from 10 to 30, q represents an integer ranging from 0 to 2, R represents an alkyl or an alkoxyl group, and X is a halogen atom or an alkoxyl group; or (B)

where m' represents an integer ranging from 1 to 8, n' represents an integer ranging from 0 to 2, p represents an integer ranging from 5 to 25, q represents an integer ranging from 0 to 2, X represents a halogen atom or an alkoxyl group, R represents an alkyl or an alkoxyl group, and A represents —O—, a —COO— or —Si($CH_3$)$_2$, for instance:

in a concentration of the order of $2 \times 10^{-3}$ to $5 \times 10^{-2}$ Mol. The glass substrate with the adsorbed monomolecule protective film 3-1 or 3-2 formed thereon was dipped in to the solution and held therein for one hour. The —OH group, —NH group or —NH$_2$ group were exposed on the substrate surface as shown in FIG. 2 or 3, a reaction was brought about between the chlorosilyl group of the chlorosilane-based surface active compound containing fluorine and the —OH, —NH or —NH$_2$ groups. Thus covalent bonds were formed on the surface, represented as the following formula 4.

Formula 4

This reaction proceeds substantially the same as above in formulas 1 to 3.

Figure 4:
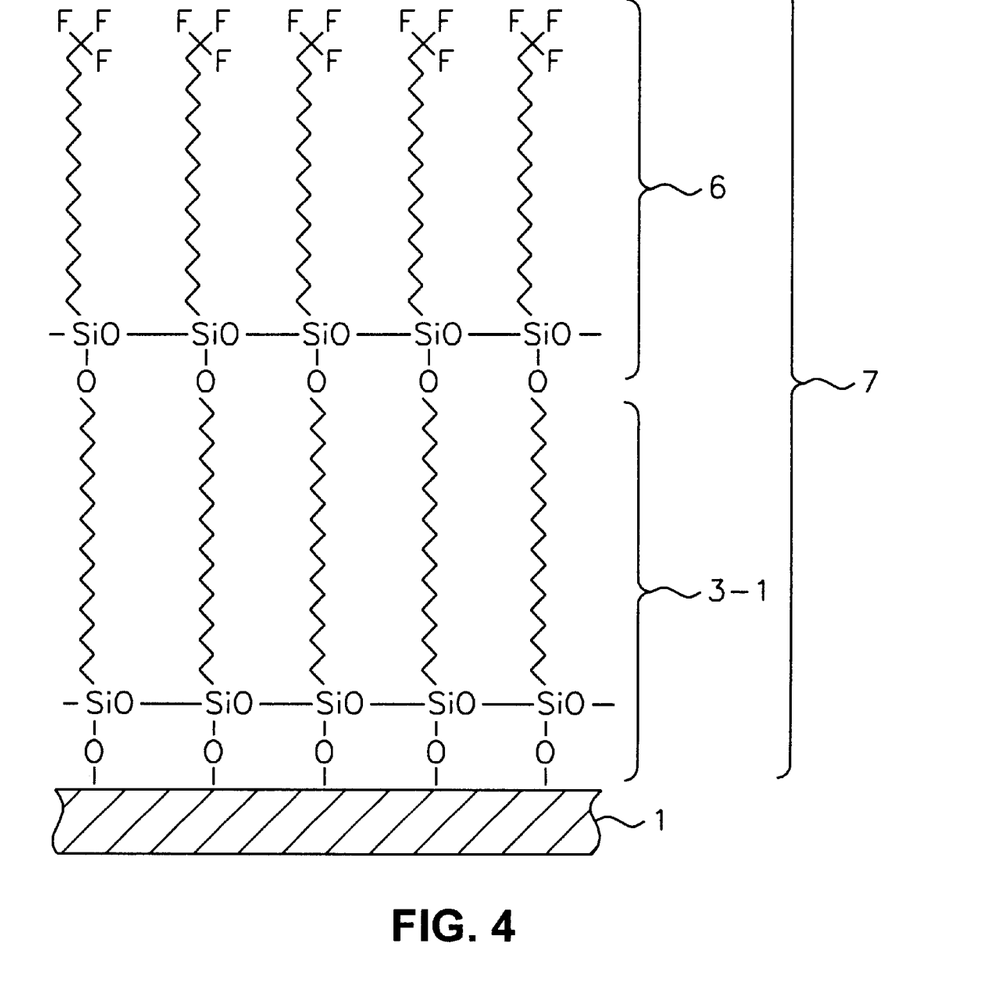
FIG. 4 is a schematic sectional view, enlarged in scale to the molecular level, showing the status of a glass surface in the formation of a chemically adsorbed film.
Figure 5:
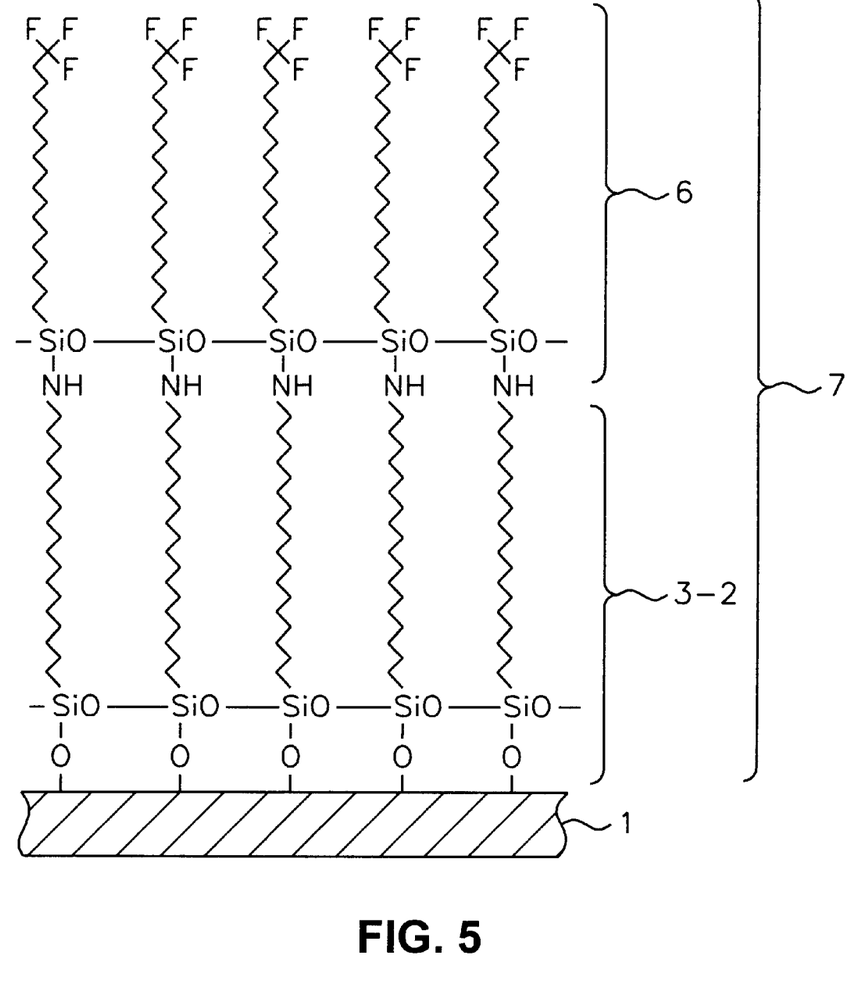
FIG. 5 is a schematic sectional view, enlarged in scale to the molecular level, showing the status of a glass surface in the formation of a chemically adsorbed film.

Thus, a highly concentrated monomolecule film lamination 7 is formed on the surface of the glass substrate such that an adsorbed monomolecule film 6 containing fluorine is chemically bonded to a lower adsorbed monomolecule film 3-1 as shown in FIG. 4 or to a lower adsorbed monomolecule film 3-2 as shown in FIG. 5.

Where no monomolecule film is required between a hydrophobic oil-phobic surface film and a glass substrate, a chlorosilane-based bassed surface active compound may be used to form an adsorbed monomolecule protective film. By so doing, a single layer of adsorbed monomolecule protective film containing fluorine on the surface can be formed.

Where a plurality of monomolecule films are necessary as protective films, CH$_2$=CH—(CH$_2$)$_n$SiCl$_3$ may be used as a chemical adsorption reagent. The steps of chemical adsorption and radiation irradiation may be repeated, and finally a chlorosilane-based surface active compound containing fluorine may be adsorbed as a chemical reagent. Thus, a hydrophobic oil-phobic film comprising a single layer of an adsorbed monomolecule film containing fluorine may be formed on the surface via a plurality of necessary protective films.

In the above embodiment, CF$_3$CH$_2$O(CH$_2$)$_{15}$SiCl$_3$, was used as a silane-based surface active compound containing fluorine outer most is surface. However, it is possible to use other compounds as well, for instance;

CF$_3$(CH$_2$)$_2$Si(CH$_3$)$_2$(CH$_2$)$_{15}$SiCl$_3$,

CF$_3$(CF$_2$)$_3$(CH$_2$)$_2$Si(CH$_3$)$_2$(CH2)$_9$SiCl$_3$,

CF$_3$COO(CH$_2$)$_{15}$SiCl$_3$, and

CF$_3$(CF$_2$)$_7$(CH$_2$)$_2$SiCl$_3$.

Figure 6:
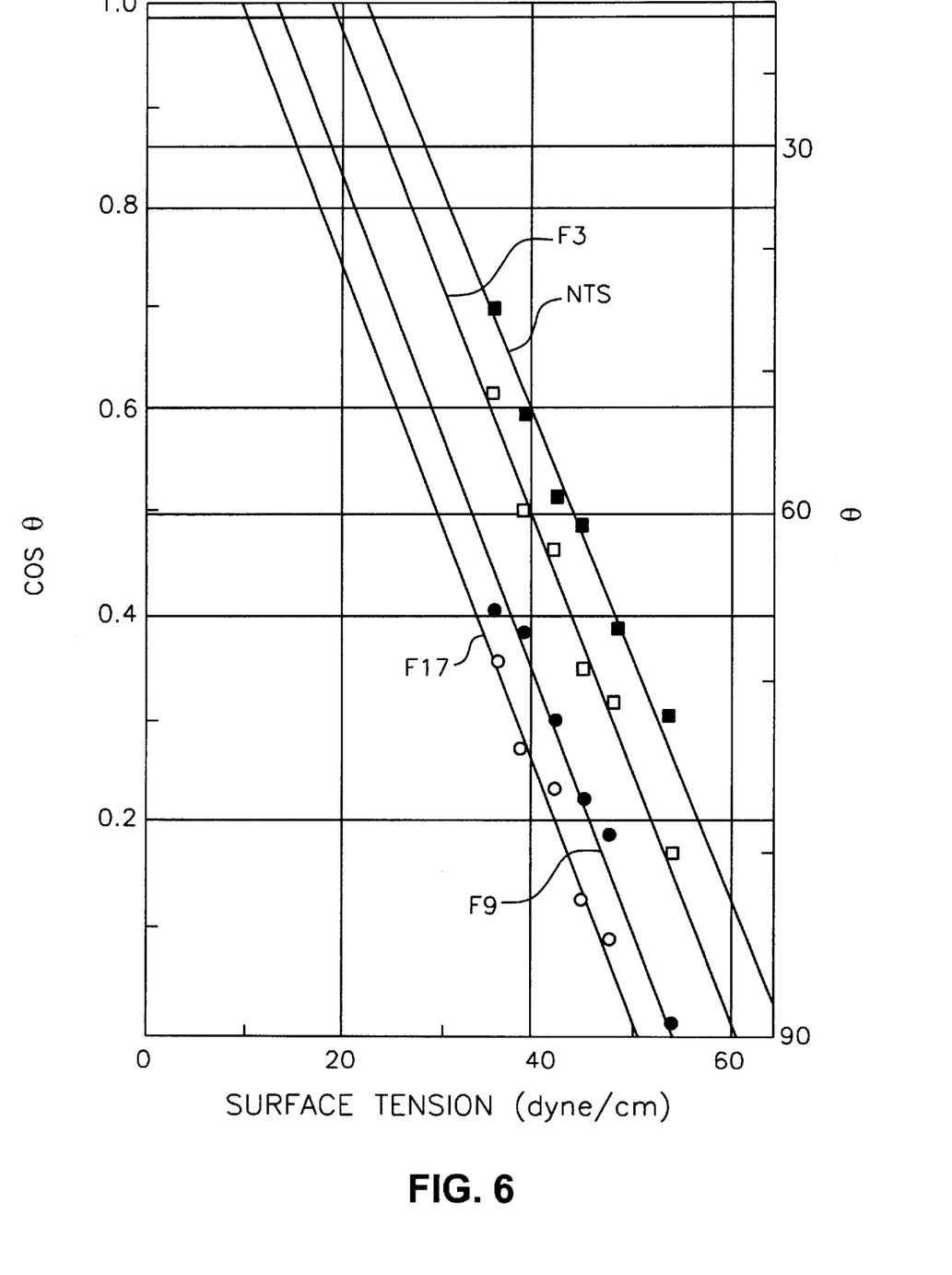
FIG. 6 is a graph showing the surface tension or energy in various chemically adsorbed films.

The surface energy or tension in the adsorbed monomolecule film was measured by evaluation of the water dip angle of contact (with an automatic contact angle gauge manufactured by Kyowa Kaimen Kagaku Co.). The results are shown in FIG. 6. FIG. 6 is a graph showing relations between cos θ and surface tension.

As is seen from FIG. 6, the surface energy is reduced as the number of fluorine atom increases. It is confirmed that when the number of fluorine atoms is 9 or more, the surface tension of the film is lower than that of polytetrafluoroethylene and that the surface is very highly hydrophobic and oil-phobic.

The water wetting angle measured at the surfaces of the adsorbed film was found to be about 140 to 150 degrees.

Thus, by using such glasses, it is possible to provide a wiperless motor vehicle windshield or windscreen glasses and simultaneously prevent fogging of the glass lens surface.

In FIG. 6, F17, F9, F3 and NTS designate adsorbed monomolecular films respectively of;

F17; CF$_3$(CF$_2$)$_7$(CH$_2$)$_2$—Si(CH$_3$)$_2$(CH$_2$)$_9$SiCl$_3$,

F9; CF$_3$(CF$_2$)$_3$(CH$_2$)$_2$O(CH$_2$)$_{15}$SiCl$_3$,

F3; CF$_3$COO(CH$_2$)$_{15}$SiCl$_3$, and

NTS; CH$_3$(CH$_2$)$_{19}$SiCl$_3$

The above embodiment is directed to tempered glass. However, the instant invention is applicable to all the glasses where improvement of the quality of the glass surfaces is a goal. For example, the above described embodiment finds particular use as a film for window glasses in vehicles, electric cars, aircraft and other means of transport, as well as mirrors, glass vessels, glass or plastic lenses and other glass or plastic surfaces wherein hydrophobic and oil-phobic characteristics are required.

Further, while the above embodiment is concerned with the adsorbed monomolecule films as glass protective films, the transparent substrate according to the invention is by no means limited to glass, but it may of course be protective films having functions as light-blocking films, ultraviolet absorption films and infrared absorption films as well.

Further, the glass is not limited to colorless transparent glass, but the invention is applicable to roughened surfaces and also to colored glass and glass fibers.

In general, the invention is applicable to all techniques of chemical coupling of glass or plastic having hydrophilic groups on the surface and a silane-based surface active compound containing a fluorophobic by using a chemical adsorption process.

Where the surface of the protective film or transparent substrate itself is not hydrophilic, the silane-based surface active compound containing a hydrophobic group may be provided after making the surface hydrophilic by usual methods, such as corona discharge in an atmosphere containing oxygen or alternatively by spattering.

The chlorosilane-based surface active compounds, in one preferred embodiment, are represented by the formulae $$F(CF_2)_m(CH_2)_nSiR_qX_{3-q}$$

or $$F(CF_2)_{m'}(CH_2)_{n'}A(CH_2)_pSiR_qX_{3-q}$$

When one of these compounds is employed, a highly concentrated and very thin organic film can be formed. The film is substantially pin hole free, with a uniform thickness, thereby forming a hydrophobic oil-phobic monomolecule film chemically coupled to the glass substrate surface. The symbols in the above formulas (A) and (B) are as defined hereinbefore.

It is thus possible to effect a very highly durable surface treatment for prevention of contamination, fogging and wetting of the glass surface.

EXAMPLE 2

A transparent substrate, shaped for use as a motor vehicle windshield or windscreen glass, was washed with an organic solution. Simultaneously a material containing a fluorocarbon group and a chlorosilane group having the formula:

$$CF_3(CF_2)_7(CH_2)_2SiCl_3$$

was dissolved in a non-aqueous solvent, i.e., a mixed solvent composed of 80 wt % of n-hexadecane, 12 wt % of carbon tetrachloride and 2–8 wt % of chloroform. The windshield glass was dipped into the solution and immersed for about 2 hours. The windshield glass had numerous hydroxyl groups on the surface, and thus a dehydrochlorination reaction was brought about between the chlorine in chlorosilyl (—SiCl) group of the material containing a fluorocarbon group and a chlorosilane group and a hydroxyl group and covalent bonds represented by formula 5 below were formed over the entire surface of the windshield glass. This reaction proceeded substantially the same as described above in formulas 1 to 3.

Formula 5

Figure 7:
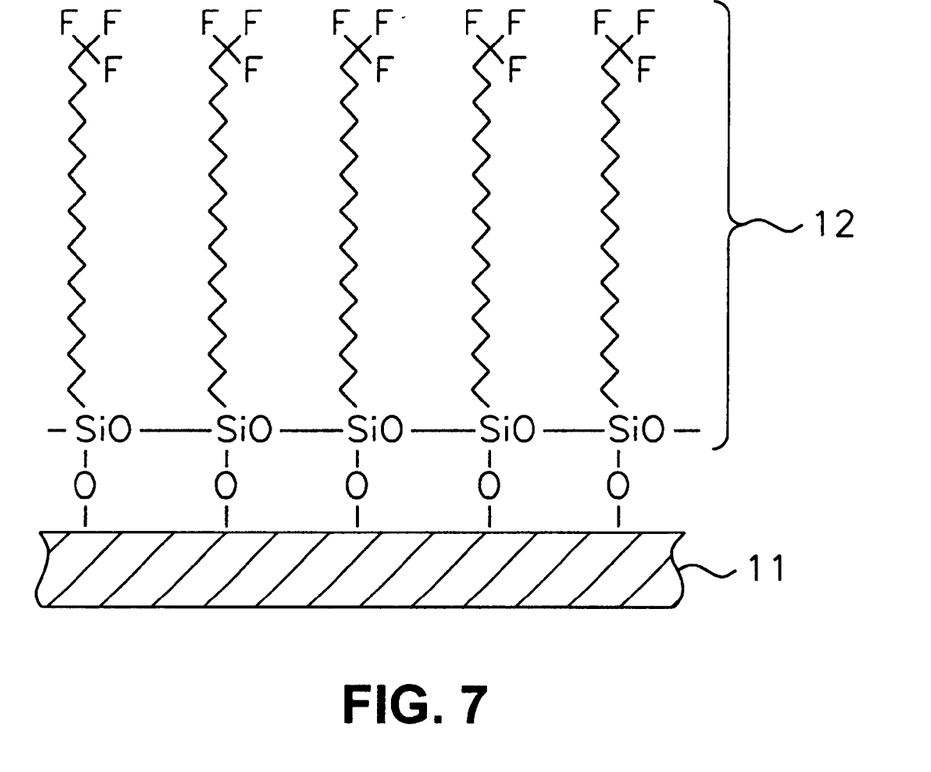
FIG. 7 is a schematic sectional view, enlarged in scale to the molecular level, showing the surface of a windshield glass as an embodiment of the transparent substrate according to the invention.

Thus, a single layer of chemically adsorbed monomolecule film 12 containing fluorine was formed in a state chemically coupled to the windshield glass 11 by siloxane bonds, as shown in FIG. 7. The thickness of this chemically adsorbed monomolecule film was assumed from the molecular structure to be about 1.5 nm. The monomolecule film was chemically coupled very firmly.

The treated windshield glass was then tested to compare the properties of treated windshield glass with untreated windshield glass. The treated windshield glass had greatly reduced contamination compared to windshield glass without the above-described treatment. Contaminants, if attached, could be easily removed by merely rubbing the glass with a brush or the like. Doing so produced neither scars nor scratches on the surface of the windshield glass 11. Further, it was possible to remove oily contaminants by merely washing with water.

Where plastic materials such as polyacrylic resins and polycarbonate resins were used as the material of the transparent substrate, the techniques described above could be used to oxidize the surface. Subsequently, the oxidized surface could then be treated with water or air, as also described above, to make the surface hydrophilic. In particular, this means plasma treatment of the surface at 300 W for about 10 minutes to make the surface oxidized and hydrophilic while replacing the adsorption liquid with a freon 113.

EXAMPLE 3

Figure 8:
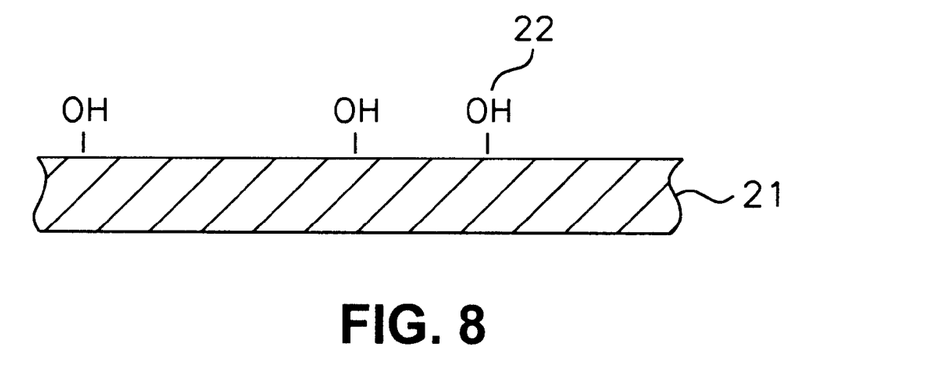
FIG. 8 is a schematic sectional view, enlarged in scale to the molecular level, showing the surface of a windshield glass as a different embodiment of the transparent substrate according to the invention.

A solution was developed by dissolving about 1 wt. % of $SiCl_4$ as a material containing chlorosilyl groups in a chloroform solvent as a non-aqueous solvent. A windshield glass with the surface containing less hydroxyl groups (although hydrophilic, e.g., an annealedly tempered glass) was dipped into the solution and immersed for about 30 minutes. Then a dehydrochlorinizing reaction was brought about on the surface of the windshield glass 21 due to the presence of some hydroxyl (—OH) groups 2 as hydrophilic groups on the surface, as shown in FIG. 8. A chlorosilane monomolecule film constituted by a material containing chlorosilyl groups was formed. By using $SiCl_4$ as a material containing chlorosilyl groups, a dehydrochlorination reaction was brought about on the surface of the windshield glass 21 even in the presence of only a small amount of hydrophilic OH groups 22 on the surface of the front window glass 21. Furthermore, molecules such as formula 6 and 7 are secured to the surface via —SiO— bonds.

Formula 6

$$\begin{array}{c} Cl \\ | \\ Cl-Si-Cl \\ | \\ O- \end{array}$$

Formula 7

$$\begin{array}{c} Cl \\ | \\ Cl-Si-O- \\ | \\ O- \end{array}$$

In this case, non-reacted $SiCl_4$ may also be present on the chlorosilane monomolecule film. However, by subsequently washing the surface of the windshield glass 21 with chloroform as a non-aqueous solvent and then with water, the hydroxyl groups and non-reacted $SiCl_4$ molecules on the surface can be removed to obtain on the surface a siloxane monomolecule film 23. The film is represented as formula 8 and 9 as shown in FIG. 5.

Formula 8

$$\begin{array}{c} OH \\ | \\ HO-Si-OH \\ | \\ O- \end{array}$$

Formula 9

$$\begin{array}{c} OH \\ | \\ HO-Si-O- \\ | \\ O- \end{array}$$

The monomolecule film 23 formed in this case is completely coupled to the surface of the windshield glass 21 via chemical bonds of —SiO—, and therefore it is never separated from the surface. In addition, the siloxane monomolecule film 23 thus obtained has numerous surface —SiOH bonds, the amount of which roughly corresponds to about three times the number of the initial hydroxyl groups.

In the solution mentioned before in connection with Example 2, the windshield glass was dipped in to the solution and immersed for about one hour. Thereupon, the windshield glass 21 developed the siloxane monomolecule film 23 on its surface. As a result, bonds as shown such as above in formula 5 were formed on the surface of the siloxane monomolecule film 23.

Figure 10:
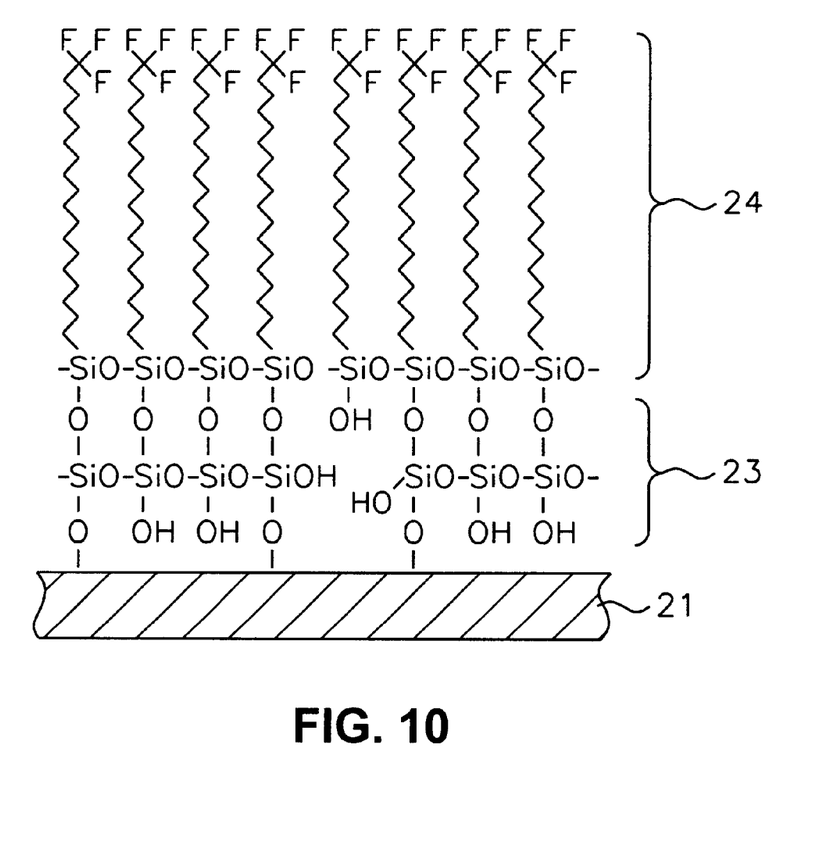
FIG. 10 is a schematic sectional view, enlarged in scale to the molecular level, showing the surface of a windshield glass as a further embodiment of the transparent substrate according to the invention.

Thus, a chemically adsorbed monomolecule film 24 containing fluorine was formed to a thickness of about 1.5 nm. over the entire glass surface in a state chemically coupled to the lower siloxane monomolecule film 23, as shown in FIG. 10. A separation test showed that the monomolecule films are never separated.

The windshield glass of this example was tested under real use conditions. The results indicate that no water drops were attached due to the hydrophobic effect of the surface fluorine. Acetone containing wax was blown against the glass by assuming the flow of wax component. It was found that oil was repelled and no fogging was produced due to the effect of the oil-phobic properties of fluorine in the monomolecule film chemically adsorbed to the surface. In addition, contaminants that were attached could be easily wiped away.

EXAMPLE 4

A transparent substrate, a display-form touch panel glass (switch of CRT glass), was prepared and washed with an organic solvent. Simultaneously,, a material containing carbon fluoride groups and chlorosilane groups, namely $CF_3(CF_2)_7(CH_2)_2SiCl_3$ was dissolved to a concentration of 1 wt. % in a non-aqueous solvent, i.e., a mixed solvent containing 80 wt. % of n-hexadecane, 12 wt. % of carbon tetrachloride and 8 wt. % of chloroform. The CRT glass was dipped into the solution and immersed for about 2 hours. The CRT glass had numerous hydroxyl groups on the surface, and thus a dehydrochlorination reaction was brought about between the chlorine in —SiCl groups of the material containing carbon fluoride groups and chlorosilane groups and hydroxyl groups on the surface. This reaction produced bonds represented by above formula 5 below over the entire surface of the CRT glass. This reaction proceed substantially the same as above in formulas 1 to 3.

Thus, a single layer of chemically adsorbed monomolecule film containing fluorine was formed and chemically coupled (i.e., covalently bonded) to the CRT glass by siloxane bonds. The thickness of this chemically adsorbed monomolecule film was about 1.5 nm. The monomolecule film was chemically coupled very firmly and was never separated.

The resultant CRT glass was tested under actual use conditions. Its contamination affinity was found to be greatly reduced compared to CRT glass without treatment. Contaminants, if attached, could be easily removed by merely wiping the glass with a paper or the like. Doing so produced neither scars nor scratches on the surface of the CRT glass.

EXAMPLE 5

This example is directed to a fresnel plate glass for an overhead projector wherein the surface contains less hydroxyl groups, although still hydrophilic in nature, e.g., an annealedly tempered glass. The glass was treated by immersing the glass for about 30 minutes in a solution. The immersion solution was developed by dissolving about 1 wt. % of $SiCl_4$ as a material containing chlorosilyl groups in a chloroform solvent (a non-aqueous solvent). The immersion initiated a chemical dehydrochlorinizing reaction on the surface of the fresnel plate glass due to the presence of some hydroxyl (—OH) groups as hydrophilic groups (inner layer film) on the surface. As the inner layer film forming material, other materials could be used in place of $SiCl_4$ such as $SiHCl_3$, $SiH_2Cl_2$, Cl—$(SiCl_2O)nSiCl_3$(n being integer).

A chlorosilane monomolecule film (inner layer) constituted by a material containing chlorosilyl groups was formed on the glass. By using $SiCl_4$ as a material containing chlorosilyl groups, a dehydrochlorination reaction was brought about on the surface of the fresnel plate glass even in a presence of only a small amount of hydrophilic OH groups on the surface of the fresnel plate glass. Furthermore, molecules described above by formulas 6 and 7 were secured to the surface via —SiO— bonds.

In this case, non-reacted $SiCl_4$ is also present on the chlorosilane monomolecule film. By subsequently washing the surface of the fresnel plate glass with chloroform (as a non-aqueous solution) and then washing with water, the hydroxyl groups and non-reacted $SiCl_4$ molecules on the surface can be removed. The removal of the hydroxyl groups and non-reacted $SiCl_4$ results in a siloxane monomolecule film represented such as above formulas 8 and 9 on the surface.

Further, as a material containing carbon fluoride groups and chlorosilane groups;

$CF_3(CF_2)_7(CH_2)_2SiCl_3$ was dissolved to a concentration of 2 wt. % in a non-aqueous solvent, i.e., a mixed solvent containing 80 wt. % of n-hexadecane, 12 wt. % of carbon tetrachloride and 8 wt. % of chloroform. The glass was immersed into the solution for about 1 hour. The glass had numerous hydroxyl groups on the surface, and thus a dehydrochlorination reaction was brought about between (1) the chlorine in the —SiCl groups of the material containing carbon fluoride groups and chlorosilane groups and (2) hydroxyl groups. The reaction produced bonds represented by above formula 5 over the entire surface of the glass.

Thus, the chemically adsorbed monomolecule film containing fluorine was formed in a state chemically coupled to the glass by siloxane bonds. The thickness of this chemically adsorbed monomolecule film was assumed from the molecular structure to be about 1.5 nm. The monomolecule film was chemically coupled very firmly and was never separated.

Figure 11:
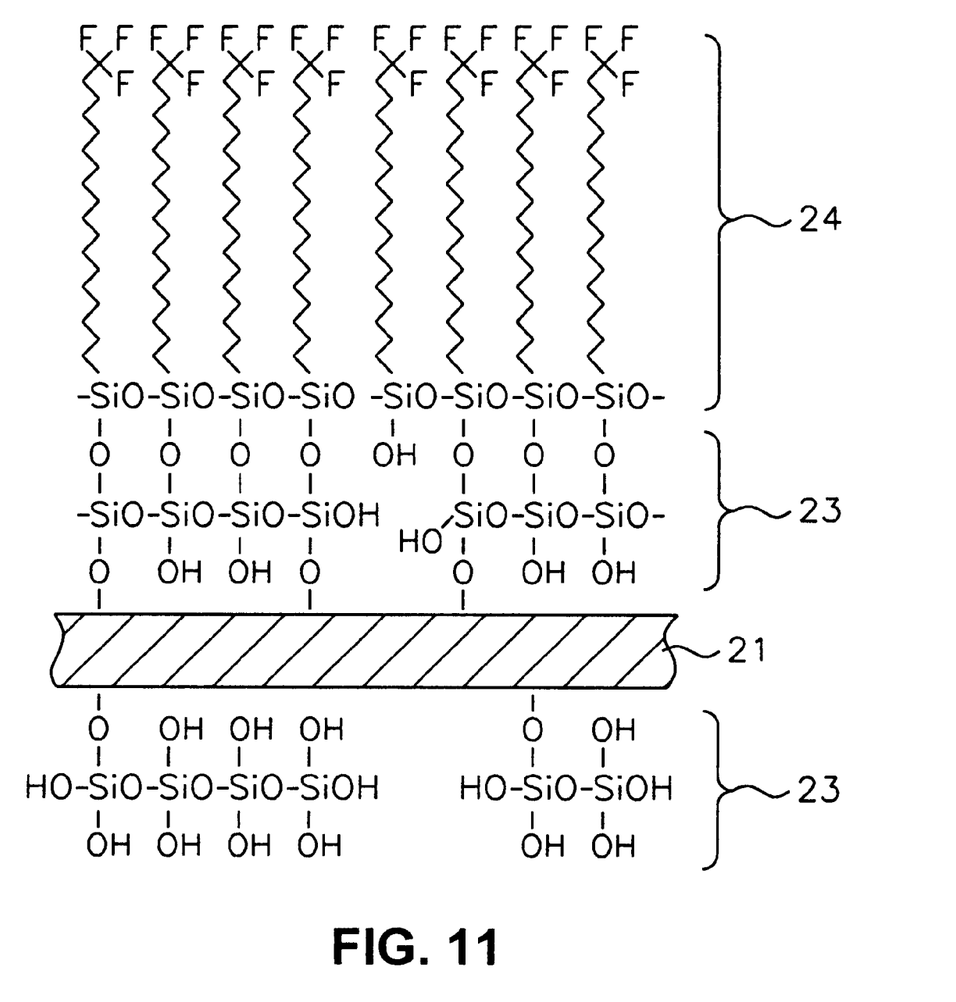
FIG. 11 is a schematic sectional view, enlarged in scale to the molecular level, showing the surface of a windshield glass as a further embodiment of the transparent substrate according to the invention.

When chemically adsorbing a monomolecule film using a non-aqueous solvent incorporating carbon fluoride groups and chlorosilane groups, an aqueous solution containing polyvinyl alcohol was also coated as a hydrophilic film. The hydrophilic film has resistance against an organic solvent on the surface which was desired to be left hydrophilic (in order to impart an antifogging effect). After the adsorption was over, the hydrophilic film was washed with water, thus obtaining a windshield glass with a hydrophobic, oil-phobic contamination free monomolecule film 24 formed on one surface and a monomolecule film 23 containing hydrophilic hydroxyl groups on the other surface, as shown in FIG. 11. The antifogging effect of this glass was tested under simulated actual use conditions, and it was found that the glass surface left hydrophilic was never fogged.

In Example 2, only a single layer of monomolecule film was formed, and in Example 3 only a single layer of silane-based surface active compound containing fluorine was formed after formation of a single layer of siloxane monomolecule film. However, the same effects can be obtained by laminating a plurality of chemically adsorbed monomolecule films according to the invention instead of forming only a single layer.

Further, while the above example used $CF_3(CF_2)_7(CH_2)_2SiCl_3$ by adding or incorporating vinylene (—CH=CH—) or ethynylene (—C≡C—) groups to or in portion represented as R in chiorosilane-based surface active compound represented as $CF_3(CF_2)_t$—$(R^2)y$—$SiCl_vX_{3-v}$, (wherein the symbols are as defined before) crosslinking can be obtained with about 5 Mrads of electron beam radiation after the formation of the monomolecule film for further improvement of the hardness of the monomolecule film.

Alternative compounds could be used in addition to or in place of the above described trichlorosilane-based surface active compounds. For example:

$CF_3CH_2O(CH_2)_{15}SiCl_3$,
$CF_3(CH_2)_2Si(CH_3)_2(CH_2)_{15}SiCl_3$,
$CF_3(CF_2)_3(CH_2)_2Si(CH_3)_2(CH_2)_9SiCl_3$,
$CF_3COO(CH_2)_{15}SiCl_3$,
$CF_3(CF_2)_7(CH_2)_2SiCl_3$,
$CF_3(CF_2)_5(CH_2)_2SiCl_3$, and chlorosilane-based surface active compounds such as;

$CF_3CH_2O(CH_2)_{15}Si(CH_3)_2Cl$,
$CF_3(CH_2)_2Si(CH_3)_2Cl$,
$CF_3CH_2O(CH_2)_{15}Si(CH_3)Cl_2$,
$CF_3COO(CH_2)_{15}Si(CH_3)_2Cl$, and chlorosilane-based surface active compounds of containing methoxy group such as;

CF$_3$CH$_2$O(CH$_2$)$_{15}$Si(OCH$_3$)$_2$Cl,
CF$_3$(CH$_2$)$_2$Si(OCH$_3$)$_2$Cl,
CF$_3$CH$_2$O(CH$_2$)$_{15}$Si(OCH$_3$)Cl$_2$, and
CF$_3$COO(CH$_2$)$_{15}$Si(OCH$_3$)$_2$Cl.

Similar effects could be obtained with such alkoxysilane-based surface active compounds such as CF$_3$(CF$_2$)$_7$(CH$_2$)$_2$Si(OCH$_3$)$_3$, and CF$_3$CH$_2$O(CH$_2$)$_{15}$Si(OCH$_3$)$_3$ by heating the surface active compound solution. Further, with chlorosilane-based surface active compounds having hydrocarbon groups such as;

CH$_3$(CH$_2$)$_9$SiCl$_3$,
CH$_3$(CH$_2$)$_{15}$SiCl$_3$,
CH$_3$CH$_2$O(CH$_2$)$_{15}$SiCl$_3$, and
CH$_3$(CH$_2$)$_2$Si(CH$_3$)$_2$(CH$_2$)$_{15}$SiCl$_3$, can be chemically adsorbed as a monomolecule film. These compounds were similarly formed into a monomolecule at room temperature to obtain the hydrophobic and contamination free effects described above.

As has been described in the foregoing, according to the instant invention a very thin transparent hydrophobic monomolecule film is formed on the transparent glass surface, and therefore the gloss which is intrinsic to the transparent glass is not spoiled. Further, the hydrophobic monomolecule film is highly hydrophobic and oil-phobic and thus enhances the repellency to contamination characteristics of the surface. It is therefore possible to provide a highly contamination free, high performance transparent glass. Further, an antifogging effect could be obtained by leaving part of the substrate surface hydrophilic According to the invention, by using a chemical adsorption method, a hydrophobic monomolecule film with a small thickness (of the nanometer level) can be formed on the surface of a transparent substrate without spoiling gloss and transparency thereof. If the hydrophobic monomolecule film contains a fluorocarbon group, it has excellent hydrophobic and oil-phobic properties and permits improvement of surface contamination prevention effect. It is also possible to form a chemically adsorbed monomolecule film having hydrophobic and contamination prevention properties on one surface and a chemically adsorbed monomolecule film containing hydrophilic groups on the other surface. This treatment thus provides a transparent substrate having different natures on opposite sides.

It is therefore possible to provide a transparent substrate, which is highly antifogging, hydrophobic, oil-phobic and contamination free.

While the above invention has been disclosed with respect to specific embodiments thereof, it is not limited thereto. The subjoined claims are intended to be construed to encompass the present invention in its full spirit and scope including such other variants and modifications as may be made by those skilled in the art without departing from that true spirit and scope.

What is claimed:

1. A transparent substrate comprising a double layer film deposited on a surface of the transparent substrate, the film including a hydrophobic outer layer with hydrophobic groups and a siloxane-based inner protective layer, wherein the outer layer is covalently bonded to the surface through siloxane groups of the inner layer.

2. The transparent substrate according to claim 1, wherein the hydrophobic group is a fluorine-containing hydrocarbon group.

3. The transparent substrate according to claim 2, wherein the hydrophobic outer layer is a monomolecule film.

4. A transparent substrate, according to claim 1, wherein the hydrophobic outer layer is formed by a chemical covalent bonding from a silane halide-based or alkoxy silane-based surface active compound of the formula:

$$F(CF_2)m(CH_2)nSiRqX_{3-q} \qquad (A)$$

wherein m represents an integer ranging from 1 to 15, n represents an integer ranging from 0 to 15, the sum of m and n ranges from 10 to 30, q represents an integer ranging from 0 to 2, R represents an alkyl or an alkoxyl group, and X is a halogen atom or an alkoxyl group, or of the formula:

$$F(CF_2)m'(CH_2)n'A(CH_2)pSiRqX_{3-q} \qquad (B)$$

wherein m' represents an integer ranging from 1 to 8, n' represents an integer ranging from 0 to 25, p represents an integer ranging from 5 to 25, q represents an integer ranging from 0 to 2, X represents a halogen atom or an alkoxyl group, R represents an alkyl or an alkoxyl group, and A represents —O—, a —COO— or —Si(CH$_3$)$_2$—.

5. The transparent substrate according to claim 4, wherein the inner protective layer is a monomolecule film.

6. The transparent substrate according to claim 4, wherein the silane halide-based surface active compound is a chlorosilane-based surface active compound of the formula:

CF$_3$(CH$_2$)$_2$Si(CH$_3$)$_2$(CH$_2$)$_{15}$SiCl$_3$,
CF$_3$(CF$_2$)$_3$(CH$_2$)$_2$Si(CH$_3$)$_2$(CH$_2$)$_9$SiCl$_3$,
CF$_3$CH$_2$O(CH$_2$)$_{15}$SiCl$_3$,
CF$_3$COO(CH$_2$)$_{15}$SiCl$_3$,
CF$_3$(CF$_2$)$_7$(CH$_2$)$_2$Si(OCH$_3$)Cl$_2$,
CF$_3$(CF$_2$)$_7$(CH$_2$)$_2$Si(CH$_3$)Cl$_2$, or
CF$_3$(CF$_2$)$_7$(CH$_2$)$_2$SiCl$_3$.

7. A transparent substrate according to claim 1, wherein the substrate is an optical device selected from the group consisting of building window glasses, mirrors, optical lenses, fresnel lenses, glass lenses, and transparent tempered glass.

8. The transparent substrate according to claim 1, wherein the substrate is selected from a group consisting of a vehicle windshield and other vehicle glasses.

9. The transparent substrate according to claim 8, wherein the inner protective layer contains bonds.

10. The transparent substrate according to claim 8, wherein the hydrophobic outer layer is a monomolecule film.

11. The transparent substrate according to claim 1, wherein the outer surface of the coated substrate is sufficiently hydrophobic to render the substrate non-adherent to oil and water.

12. The transparent substrate according to claim 1, wherein the hydrophobic outer layer is made with a chlorosilane molecule.

13. The transparent substrate according to claim 12, wherein the chlorosilane molecule is a molecule selected from the group consisting of CH$_3$(CH$_2$)$_9$SiCl$_3$,
CH$_3$(CH$_2$)$_{15}$SiCl$_3$, $CH_3CH_2O(CH_2)_{15}SiCl_3$, and
$CH_3(CH_2)_2Si(CH_3)_2(CH_2)_{15}SiCl_3$.

14. The transparent substrate according to claim 12, wherein the chlorosilane molecule is a molecule selected from the group consisting of $CF_3(CF_2)_7(CH_2)_2SiCl_3$,
$CF_3CH_2O(CH_2)_{15}SiCl_3$,
$CF_3(CH_2)_2Si(CH_3)_2(CH_2)_{15}SiCl_3$,
$CF_3(CF_2)_3(CH_2)_2Si(CH_3)_2(CH_2)_9SiCl_3$,
$CF_3COO(CH_2)_{15}SiCl_3$, and
$CF_3(CF_2)_5(CH_2)_2SiCl_3$.

15. The transparent substrate according to claim 12, wherein the chlorosilane module has a fluroalkyl group, wherein the number fluorine atoms counted from the end of the module is between 9 and 31.

16. A vehicle windshield comprising a transparent substrate according to claim 1.

* * * * *